United States Patent [19]

Brown et al.

[11] 4,089,260

[45] May 16, 1978

[54] PATTY FINISHING COOKER

[75] Inventors: John S. Brown, Half Moon Bay; Robert B. Forney, Sausalito, both of Calif.

[73] Assignee: N.P.I. Corporation, Burlingame, Calif.

[21] Appl. No.: 757,745

[22] Filed: Jan. 7, 1977

[51] Int. Cl.² .......................................... A47J 37/00
[52] U.S. Cl. ...................................... 99/386; 99/355; 99/483; 426/383; 99/388
[58] Field of Search ................. 69/7.5; 34/160; 53/39; 426/383, 104, 523; 219/373, 388 C; 99/386, 388, 352, 443 C, 389, 390, 391, 393, 401, 483, 355

[56] References Cited

U.S. PATENT DOCUMENTS

| 2,246,719 | 6/1941 | Burnham | 99/483 |
| 3,214,845 | 11/1965 | Huffman | 34/160 |
| 3,604,336 | 9/1971 | Straub | 99/386 |
| 3,987,718 | 10/1976 | Lang-Ree | 99/386 |
| 4,026,201 | 5/1977 | Fetzer | 99/355 |

FOREIGN PATENT DOCUMENTS 579,895  8/1946  United Kingdom .................. 99/386

Primary Examiner—Billy J. Wilhite
Attorney, Agent, or Firm—Lothrop & West

[57] ABSTRACT

A patty cooker particularly for use in finishing precooked meat patties having a predetermined transverse dimension has a frame on which a conveyor made up of rather widely spaced, small diameter cross bars advances in a predetermined direction. A nozzle or preferably a plurality of nozzles having outlet openings elongated in the direction of conveyor advance are arranged side by side transversely of the conveyor and close to the patty. A jet of hot air issues from each nozzle and impinges upon the patty in a restricted area. The jets leave untouched zones between such areas. The effect is to provide browned or seared marks or parallel stripes on the patty like grill marks. Preferably nozzles are arranged above and below the conveyor and directed toward the patty from opposite directions, simultaneously to provide sear marks both top and bottom.

6 Claims, 5 Drawing Figures

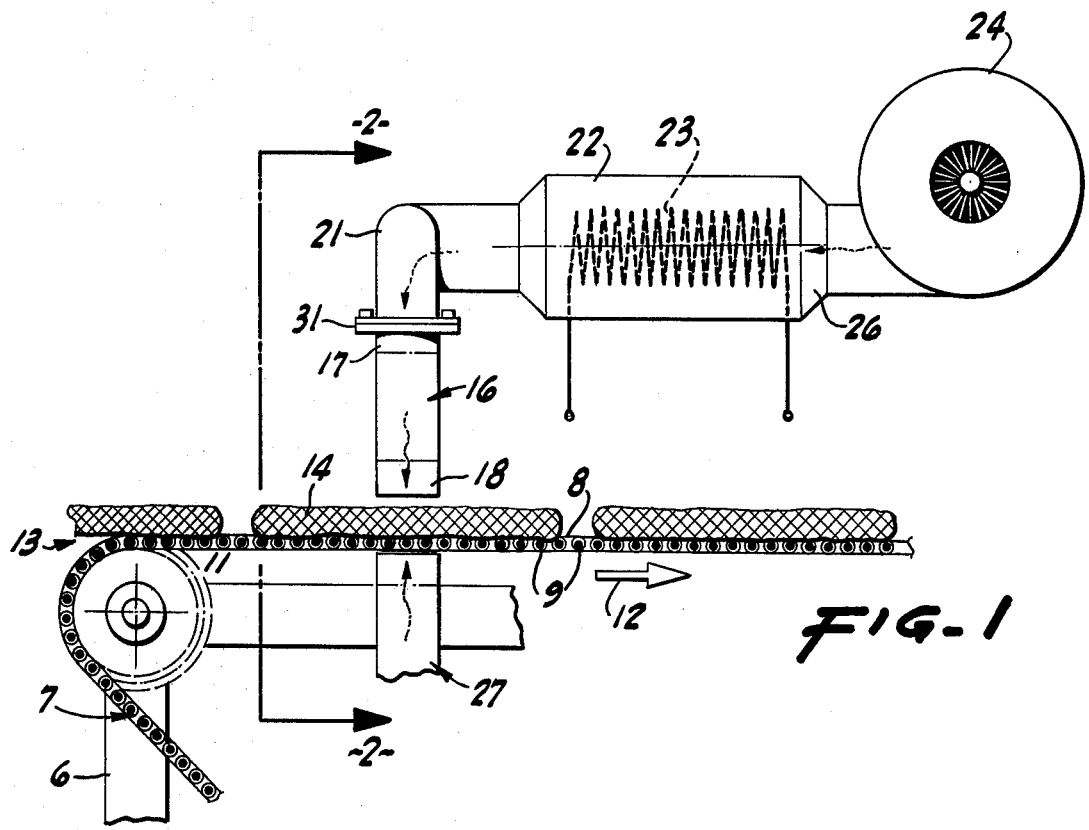
FIG-1
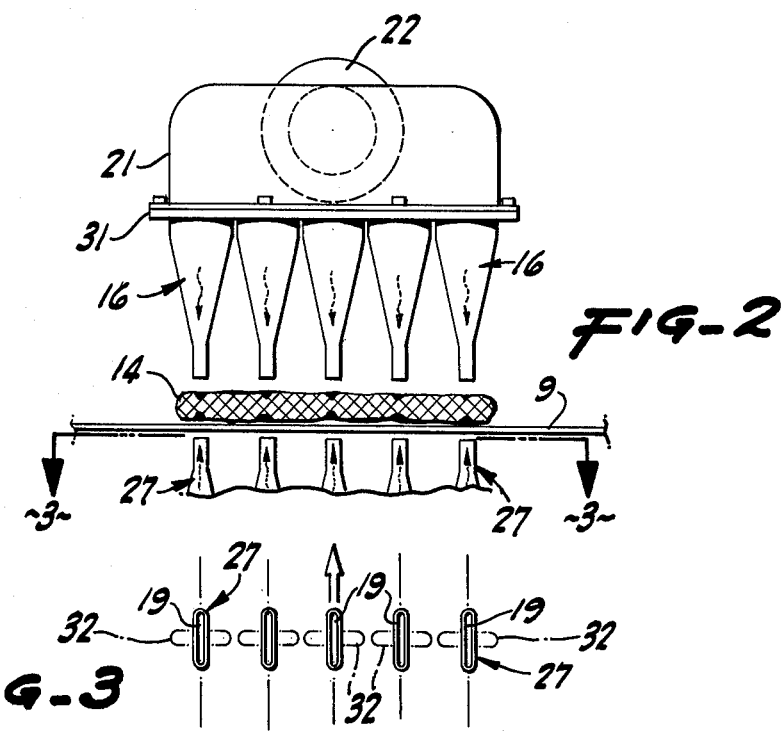
FIG-2
FIG-3

PATTY FINISHING COOKER

BRIEF SUMMARY OF THE INVENTION

An uncooked or partially cooked meat patty, usually of hamburger dimensions, is advanced in a predetermined direction on an open-work conveyor between upper and lower series of elongated jets discharging streams of hot air against the opposite faces of the patty in the general direction of advance thereof to leave localized, elongated sear marks simulating grill marks. If desired, the nozzles can alternatively be arranged at such attitudes that the entire surface of the patty is browned uniformly.

BRIEF DESCRIPTION OF THE SEVERAL VIEWS OF THE DRAWING

FIG. 1 is a side elevation of the patty finishing cooker of the invention, portions thereof being broken away and other portions being indicated diagrammatically.

FIG. 2 is a cross-section, the plane of which is indicated by the line 2—2 of FIG. 1.

FIG. 3 is a plan view, the plane of which is indicated by the line 3—3 of FIG. 2.

DETAILED DESCRIPTION

Figure 4:
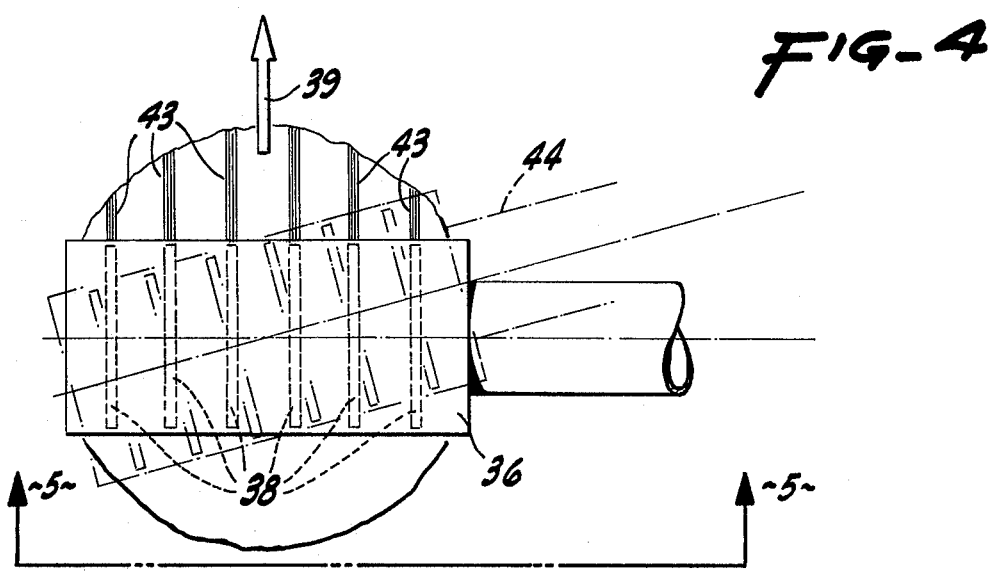
FIG. 4 is a plan, portions being broken away, of a modified form of patty finishing cooker.

In the preparation of many foodstuffs, it is desired to provide a particular sort or kind of finish, either to a cooked product or to a raw or semi-cooked product. In the case of meat patties, for example, as utilized in hamburgers or in the case of steaks, fish and comparable items often grilled, it is desirable to finish the item with a number of sear or grill marks. These are generally narrow, parallel stripes of a very dark brown contrasting with the general color of the patty or comparable portion. While this is the main desideratum, it is sometimes desired alternatively to impart a special, darker color, uniform finish to the item. Sometimes it is desired to provide marks or stripes and the like on both sides of the food.

It is therefore an object of the invention to accomplish all of the foregoing aims in an expeditious and economical and pleasing fashion, both from the standpoint of product edibility and from the standpoint of attractive appearance, even though relatively large numbers of patties or similar foods are involved.

To accomplish these various aims, there is in the present instance provided a generally represented frame 6 on which there is disposed a conveyor 7. This takes the form of side chains 8 cross-connected at rather long intervals by round bars 9, the bars being relatively small in diameter but being spaced apart a substantial distance to afford long spaces therebetween. The conveyor is engaged with a sprocket 11 on the frame and is properly driven so that the horizontal chain upper run advances in the direction of the arrow 12 in FIG. 1.

The chain or bar conveyor is arranged in such a fashion that at the feeding end 13 there can be loaded onto the conveyor in any convenient fashion one or more items for cooking, such as meat patties 14. A typical meat patty for use in hamburgers and the like is a compact disc approximately 4 inches or so in diameter and approximately ½ inch or so in thickness. The patty, usually precooked, advances from the feeding end of the conveyor 13 and travels just under a first group of nozzles 16 supported from the frame 6. These are arranged transversely of the machine and are spaced apart transversely of the machine.

Each of the nozzles is approximately circular at its upper end 17 but is transversely reduced in size to form its lower end 18, as shown in FIG. 3, into an elongated outlet 19. The discharge opening or nozzle tip is relatively narrow transversely of the machine and is about the same dimension as the top of the nozzle longitudinally of the machine or in the direction of the arrow 12. The lower end of the nozzle is at an elevation just above the patty 14. The nozzles are normally arranged with their respective flattened outlets 19 parallel to each other, the space between adjacent nozzles being several times the width of a nozzle tip. The entire group 16 of nozzles extends for about the width or diameter of the customary patty 14.

The entire group of nozzles is mounted on and in communication with a manifold 21 connected to a heating chamber 22. This is a plenum or air container for a heating means. Preferably, installed in the chamber 22 are electric heating coils 23 adapted to achieve a relatively high air temperature; for example, about 1000° to 1200° F. To ensure high speed flow of hot air from the chamber, there is provided a power-driven blower 24 connected to the chamber 22 by a fitting 26. When this device is in operation, the blower 24 takes atmospheric air and blows it through the chamber 22. Therein the air is heated by the high temperature electric elements 23 to a corresponding elevated temperature. Hot air is discharged from the chamber 22 into the manifold 21 and issues from the elongated outlets 19 of the several nozzles 16. This air emerges at high velocity in jet form; that is, in a narrow blade-like configuration. The air jet issues from the nozzle close to the subjacent patty. The surface of the patty immediately impinged by the jet is cooked, browned or charred immediately below each nozzle outlet but is not substantially affected between the nozzle outlets. Since the conveyor is concurrently advancing, the patty begins to receive brown striations at its leading edge and when it emerges from beneath the nozzles is striated with parallel strips longitudinally across its exposed surface and has untreated areas between the sear marks. The intervening areas, even in a thoroughly precooked patty, are somewhat grayish, so there is substantial contrast. The appearance is just as though the patty had been grilled on a bar grill. The arrangement uses high velocity hot air for a relatively short time, as compared to normal surface cooking or grilling, and allows close control of the amount or depth of browning. Some heat from the jets making the stripes travels into the rest of the patty and assists in cooking, so is not wasted. The air issues from the nozzles at a rate higher than the propagation velocity of flame, so there is little or no flame cooking at the surface and correspondingly little or no smoke due to flame and little or no fat burning or splattering.

Preferably both sides of the patty are treated simultaneously. For that reason, particularly as shown in FIG. 2, there is provided on the frame and beneath the conveyor a second group 27 of nozzles generally immediately below the nozzle group 16 and similarly connected to an individual hot air supply or the same hot air supply 22. The action from below is substantially the same as from above, except that the cross bars 9 interfere slightly with impingement of the hot air on the under side of the patty. The bars are spaced apart quite far to allow ready access to the patty by the lower jets. Nevertheless, there is some air jet interruption. Visually the lower side of the patty, although generally marked with longitudinal stripes, may have some interruptions in those stripes. After they have passed by the nozzles, the patties are carried along for discharge.

Under some circumstances the same device can be utilized not for providing striations or stripes on the patty, but rather for giving it a uniform dark exterior appearance by general surface cooking. When that is to be accomplished, the device is made so that the individual nozzles 16 are circular at their upper ends and are joined in the manifold 21 with a flange construction 31 so that the individual nozzles are rotatable about vertical axes. Normally the nozzles have their elongated outlets positioned as shown in FIG. 3 and parallel to the direction of conveyor advance. For this special purpose, the nozzles are turned, either some or all of them, so that the elongated nozzle position 32 is transverse to the direction of advance. Hot air ejecting from the nozzles then covers substantially all of the transverse dimension of the patty as it passes adjacent them. The lower nozzles can be similarly turned, and in this way the two surfaces of the patty can be uniformly finished or finally cooked.

In some rarer instances, the conveyor 7 can be run somewhat more slowly with the nozzles turned transversely instead of longitudinally, and initially raw patties can be completely cooked. The device therefore can produce at least two styles of surface finish in addition to finish cooking and complete cooking.

Figure 5:
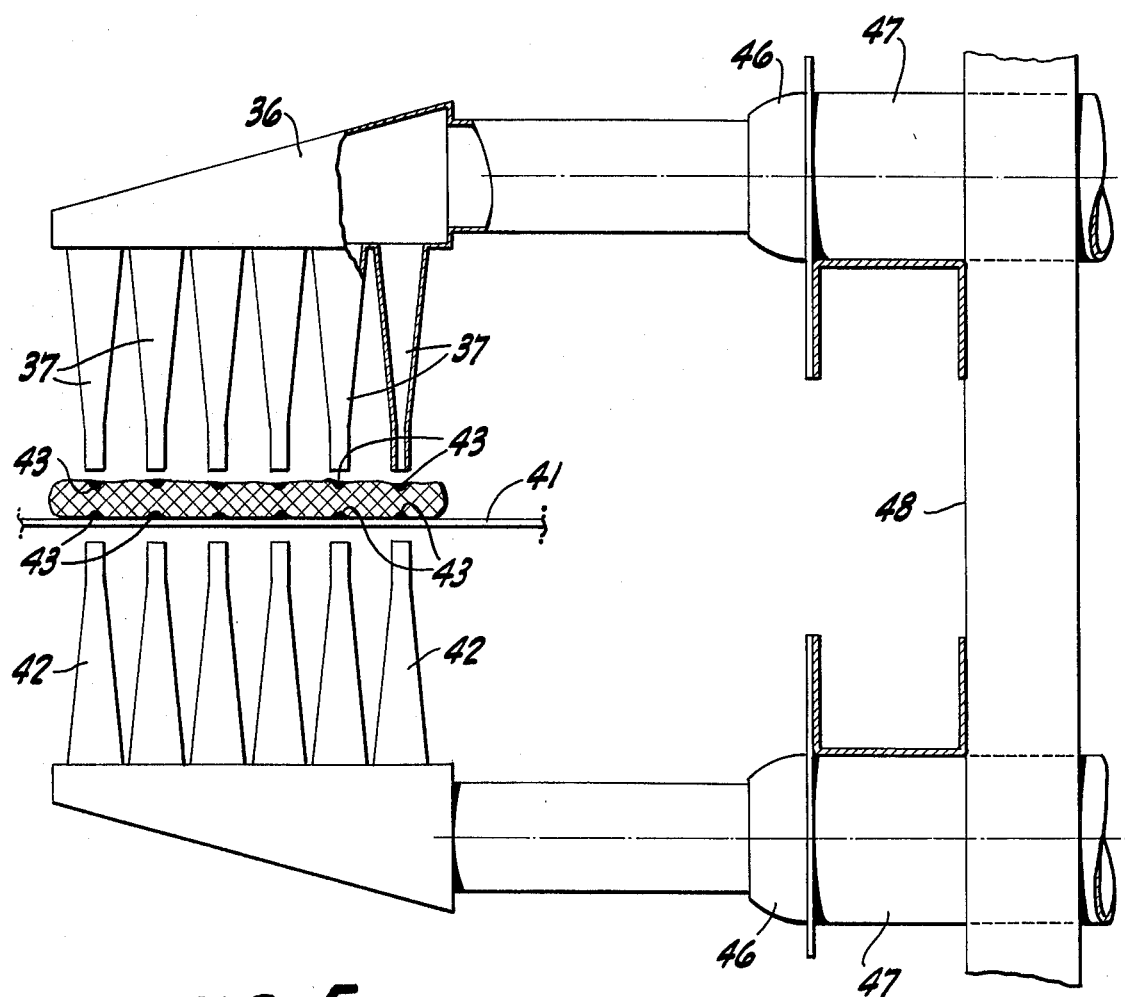
FIG. 5 is a cross-section, the plane of which is indicated by the line 5—5 of FIG. 4.

Under some circumstances there is no need to provide individual, rotatable nozzles. In that case, an arrangement as shown in FIGS. 4 and 5 may be employed. The generality is as previously described, but in this embodiment the manifold 36, comparable to the manifold 21 and being similarly supplied with hot air, has a number of nozzles 37 therein arranged generally to have their elongated openings 38 extending in the direction of advance 39 of the conveyor 41. All of the nozzles are arranged similarly, and no one is movable with respect to the others. With this arrangement, there is usually provided a similar group 42 of nozzles below the conveyor.

When the device is set with the nozzle outlets, such as 38, parallel to the direction of advance, the striations 43 or marks as previously described are appropriately made entirely across the patty longitudinally and spaced apart across the patty transversely.

If it is desired to provide a generally brown surface rather than a striped or striated surface, the manifold 36 is arranged at an angle, as indicated by the dotted lines 44 in FIG. 4. There is a swivel connection 46 in the hot air duct 47 extending from the frame 48. By cocking the manifold 36 at a small angle to the direction of advance, the various narrow elongated jets tend to overlap each other or at least to be coterminous, as shown in FIG. 4. There is then a relatively uniform impingement of the sundry jets on the surface of the patty. In this adjustment, the striations are not made, but the whole surface is browned. The patty can be entirely cooked in this fashion rather than just superficially browned.

Depending in general upon the effect or effects desired; for example, striations, general browning or both, the jets and nozzles can be varied. Also the configuration and dimensions of the jets and nozzles can be changed. The nozzles can be effective even though they may be relatively short, in some cases not much more than apertures in a sheet or small tubes, although contoured flow walls are beneficial and the reduction of surface friction provides good jets with less energy. The terms "jets" and "nozzles" used herein should be read with this understanding.

We claim:

1. A patty finishing cooker for a patty of a predetermined transverse dimension comprising a frame, a conveyor, means for supporting and advancing said conveyor on said frame in a predetermined direction, a nozzle having an elongated outlet opening of a width substantially less than said predetermined transverse dimension, means for mounting said nozzle on said frame with said nozzle directed toward said conveyor and with said elongated outlet substantially parallel to said predetermined direction, and means for discharging a jet of hot air from said outlet toward and against a transversely narrow portion of said patty only and away from parts of said patty on either transverse side of said portion.

2. A device as in claim 1 including means for heating said jet of hot air to a temperature sufficient to sear said transversely narrow portion only of said meat patty.

3. A device as in claim 1 in which said outlet is of a transversely narrow dimension, and means for mounting said outlet close enough to a patty on said conveyor to direct said jet of hot air onto an area of said patty of only said transversely narrow dimension.

4. A device as in claim 1 including a plurality of said nozzles, and means for supporting said nozzles in an arrangement with the outlets thereof spaced apart transversely of said conveyor at distances apart to separate the area of impingement of each of said jets on said patty from the impingement areas of adjacent ones of said jets and to leave unimpinged spaces between said areas of impingement.

5. A device as in claim 1 including means for disposing said elongated nozzle outlet out of parallelism with said predetermined direction.

6. A device as in claim 1 in which said nozzle has an inlet portion spaced away from said conveyor and having a transverse dimension substantially equal to a predetermined fraction only of the transverse width of a patty on said conveyor, and has a discharge portion adjacent said conveyor of a predetermined width substantially less than said transverse dimension whereby said nozzle tapers transversely from said inlet portion to said discharge portion substantially to confine discharge from said discharge portion to said predetermined width.

* * * * *